(12) United States Patent
Rowland

(10) Patent No.: US 7,891,635 B2
(45) Date of Patent: Feb. 22, 2011

(54) EQUIPMENT PAD WITH INTEGRATED RISER

(75) Inventor: Jay R. Rowland, Duluth, GA (US)

(73) Assignee: J.F.R. Enterprises, Inc., Johns Creek, GA (US)

( * ) Notice: Subject to any disclaimer, the term of this patent is extended or adjusted under 35 U.S.C. 154(b) by 402 days.

(21) Appl. No.: 11/833,298

(22) Filed: Aug. 3, 2007

(65) Prior Publication Data

US 2008/0029684 A1 Feb. 7, 2008

Related U.S. Application Data

(60) Provisional application No. 60/821,414, filed on Aug. 4, 2006.

(51) Int. Cl.
*F16M 1/00* (2006.01)

(52) U.S. Cl. ............... 248/678; 248/188.2; 248/346.02; 220/571

(58) Field of Classification Search ................. 248/678, 248/188.2, 346.02, 346.5; 184/106; 220/571, 220/573
See application file for complete search history.

(56) References Cited

U.S. PATENT DOCUMENTS

| D32,575 S | 4/1900 | Stevenson |
|---|---|---|
| 1,487,065 A | 3/1924 | Irons |
| 1,584,175 A | 5/1926 | Irons |
| 1,915,849 A | 6/1933 | Crimmel et al. |
| 2,544,743 A | 3/1951 | Vrabcak |
| 2,934,003 A | 4/1960 | Ladymon |
| 3,480,178 A | 11/1969 | Morgan |
| 3,724,233 A | 4/1973 | Pugh et al. |
| 3,788,581 A | 1/1974 | Rutzick |
| 3,790,115 A | 2/1974 | Fox |
| 3,848,546 A | 11/1974 | Lawlor |
| 4,050,659 A | 9/1977 | McCannon et al. |
| 4,243,197 A | 1/1981 | Wright |
| D262,104 S | 12/1981 | Simpson |
| D271,328 S | 11/1983 | Lanier et al. |
| 4,480,748 A | 11/1984 | Wind |
| 4,484,661 A | 11/1984 | Evenson |
| 4,604,874 A | 8/1986 | Seeley |

(Continued)

FOREIGN PATENT DOCUMENTS

AU 2006100199 A4 4/2006

(Continued)

OTHER PUBLICATIONS

Non-final Office Action and Notice of References Cited, mailed for U.S. Appl. No. 11/320,992 on Apr. 10, 2008.

(Continued)

*Primary Examiner*—Terrell Mckinnon
*Assistant Examiner*—Bradley H Duckworth
(74) *Attorney, Agent, or Firm*—Sutherland Asbill & Brennan, LLP

(57) ABSTRACT

An equipment pad for a condensing unit including a base and at least one substantially hollow riser affixed to the base, wherein the at least one substantially hollow riser extends substantially vertically from the base to support the condensing unit. The equipment pad may be stackable or nestable with a second equipment pad.

16 Claims, 4 Drawing Sheets

U.S. PATENT DOCUMENTS

| | | | |
|---|---|---|---|
| 4,653,651 | A | 3/1987 | Flum |
| 4,687,604 | A | 8/1987 | Geottl |
| 4,733,790 | A | 3/1988 | Stein |
| 4,783,971 | A | 11/1988 | Alba |
| 4,814,752 | A | 3/1989 | Lehman |
| 4,835,984 | A | 6/1989 | Vyavaharkar |
| 4,869,456 | A | 9/1989 | Jacobs |
| 4,917,581 | A | 4/1990 | Richardson |
| D308,247 | S | 5/1990 | Adam |
| 4,930,632 | A | 6/1990 | Eckert |
| D309,571 | S | 7/1990 | Lehman |
| 5,076,534 | A | 12/1991 | Adam |
| 5,147,039 | A | 9/1992 | Sechler |
| 5,230,601 | A | 7/1993 | Apps et al. |
| 5,249,699 | A | 10/1993 | Williams |
| 5,307,931 | A | 5/1994 | Gillispie |
| D353,665 | S | 12/1994 | Jennings |
| 5,392,944 | A | 2/1995 | Jennings |
| 5,429,236 | A | 7/1995 | Evans |
| D368,409 | S | 4/1996 | Schwartz |
| D399,095 | S | 10/1998 | Schmidt |
| 5,881,566 | A | 3/1999 | Shacklock et al. |
| 5,961,093 | A | 10/1999 | Jones |
| 6,044,592 | A * | 4/2000 | Strieter ............. 52/27 |
| 6,065,531 | A | 5/2000 | Schneider |
| D426,110 | S | 6/2000 | Schmidt |
| D431,958 | S | 10/2000 | Harris |
| 6,286,328 | B1 | 9/2001 | Kawahara |
| 6,360,911 | B1 | 3/2002 | Arnold |
| 6,382,108 | B1 | 5/2002 | Stanek et al. |
| 6,718,788 | B1 | 4/2004 | Shuck |
| 6,766,615 | B2 | 7/2004 | Smead |
| D496,058 | S * | 9/2004 | Sargent et al. ......... D15/141 |
| 6,797,894 | B2 | 9/2004 | Montagnino et al. |
| 6,868,689 | B1 | 3/2005 | McNeil et al. |
| 6,978,909 | B2 | 12/2005 | Geotzinger |
| D590,123 | S | 4/2009 | Hermans |
| D590,124 | S | 4/2009 | Hermans |
| D590,572 | S | 4/2009 | Hermans |
| D590,573 | S | 4/2009 | Hermans |
| D600,874 | S | 9/2009 | Hermans |
| D600,875 | S | 9/2009 | Hermans |
| D608,917 | S | 1/2010 | Ward et al. |
| 2006/0144071 | A1 | 7/2006 | Rowland |
| 2010/0207004 | A1 | 8/2010 | Hermans et al. |

FOREIGN PATENT DOCUMENTS

| | | |
|---|---|---|
| DE | 2650288 | 5/1978 |
| KR | 200402748 | 3/2004 |
| WO | WO0039512 | 7/2000 |
| WO | 03064239 A1 | 8/2003 |
| WO | 2007068036 | 6/2007 |

OTHER PUBLICATIONS

Final Office Action and Notice of References Cited, mailed for U.S. Appl. No. 11/320,992 on Jun. 5, 2008.

Advisory Action, mailed for U.S. Appl. No. 11/320,992 on Sep. 3, 2008.

Non-final Office Action and Notice of References Cited, mailed for U.S. Appl. No. 11/320,992 on Dec. 19, 2008.

Examiner Interview Summary, mailed for U.S. Appl. No. 11/320,992 on Mar. 24, 2009.

Non-final Office Action and Notice of References Cited for U.S. Appl. No. 11/320,992 mailed on Jul. 6, 2009.

Final Office Action for U.S. Appl. No. 11/320,992, mailed May 19, 2010.

Advisory Action for U.S. Appl. No. 11/320,992, mailed Jun. 9, 2010.

Final Office Action for U.S. Appl. No. 11/320,992 mailed Jul. 12, 2010.

Advisory Action for U.S. Appl. No. 11/320,992, mailed Aug. 30, 2010.

Final Office Action for U.S. Appl. No. 11/320,992, mailed Sep. 16, 2009.

Interview Summary for U.S. Appl. No. 11/320,992, mailed Oct. 26, 2009.

Non-final Office Action and Notice of References cited for U.S. Appl. No. 11/320,992, mailed Dec. 8, 2009.

* cited by examiner

EQUIPMENT PAD WITH INTEGRATED RISER

CROSS-REFERENCE TO RELATED APPLICATIONS

The present application claims the benefit of priority under 35 U.S.C. §119(e) to U.S. Provisional Application No. 60/821,414, filed on Aug. 4, 2006, the disclosure of which is incorporated herein by reference in its entirety.

TECHNICAL FIELD

The present application relates generally to the field of equipment pads and more particularly relates to a pad with an integrated riser.

BACKGROUND OF THE INVENTION

Condensing units, such as those used in central air conditioning and heat pump installations, are generally installed on equipment pads. Such equipment pads have previously been made of pre-cast concrete and lightweight foam/concrete composites. More recently, as plastics have improved they have become a popular choice due to their low price, ease of handling, light weight, and cleanliness.

Condensing units are frequently elevated above the equipment pad using risers to increase airflow and prevent obstruction due to things such as snow/ice and landscaping materials. A variety of objects are frequently used as risers, including lumber, cap stones, cinder blocks, and plastic cones or cylinders. The risers often appear unattractive and unstable to the average consumer. Additionally, the average installer can have difficulty placing a unit on four independent risers with mastic on top to hold the unit in place. Moreover, the need for separate risers increases not only the material cost of an installed condensing unit, but also the time and labor costs for sourcing, carrying, and installing the risers.

Accordingly, there is a desire for an equipment pad that includes a riser that adequately and safely supports a condensing unit. There also is a need for an equipment pad that includes a riser that may be easily shipped and stored.

SUMMARY OF THE INVENTION

An exemplary embodiment of the present application provides an equipment pad for the elevation of a condensing unit. The equipment pad may include a base and one or more substantially hollow risers extending substantially vertically from the base to elevate and support the condensing unit off of the equipment pad. The equipment pad also may be stackable with other equipment pads through the substantially hollow risers.

Another exemplary embodiment of the present application includes a method for elevating a condensing unit. The method may include the steps of positioning a stackable equipment pad at a desired location for the condensing unit and positioning a condensing unit on one or more risers extending substantially vertically from the base of the stackable equipment pad to elevate and support the condensing unit off of the base of the equipment pad.

DETAILED DESCRIPTION OF THE INVENTION

The present application now will be described more fully hereinafter with reference to the accompanying drawings, in which several embodiments of the application are shown. This application may, however, be embodied in many different forms and should not be construed as limited to the embodiments set forth herein. Like numbers refer to like elements throughout the drawings.

Figure 1:
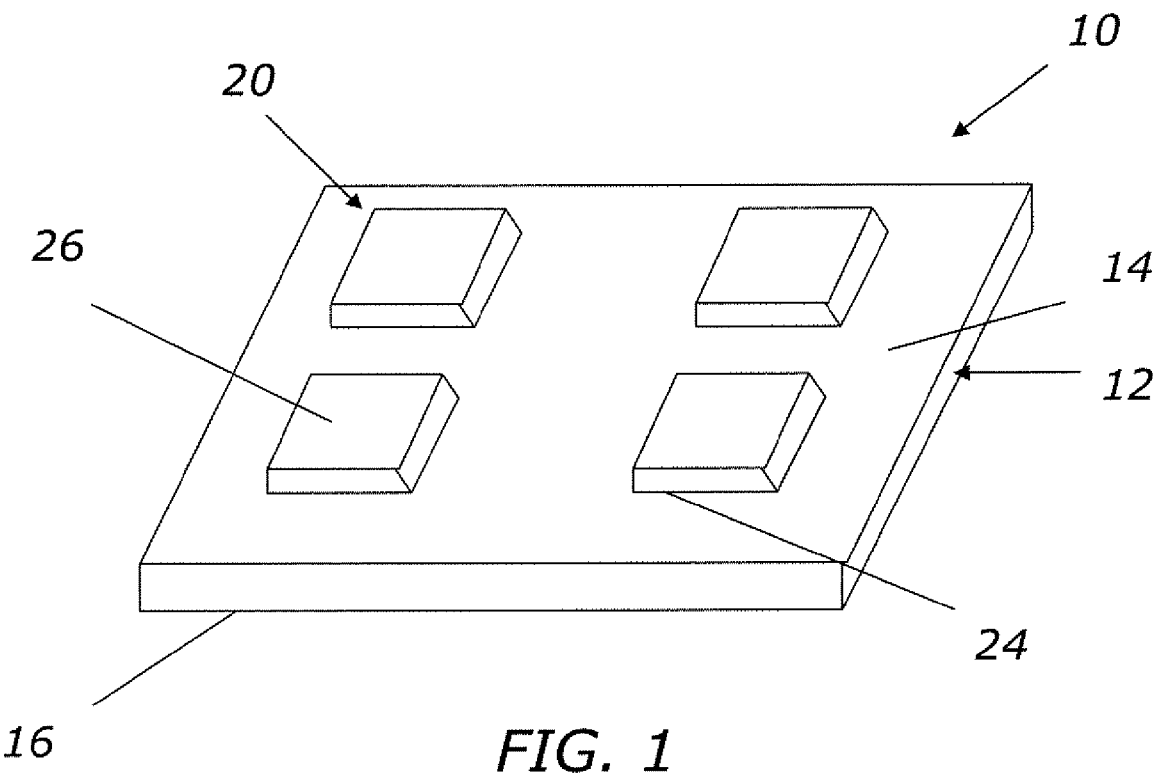
FIG. 1 is a perspective view of an equipment pad with a plurality of integrated risers according to an embodiment of the application.
Figure 3:
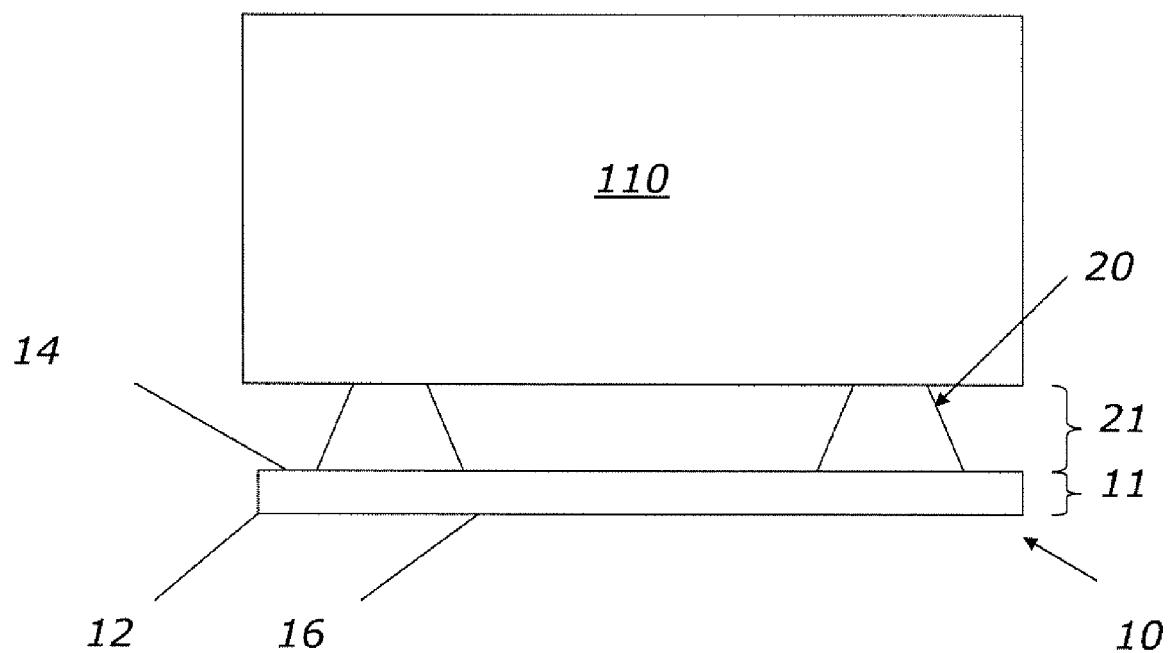
FIG. 3 is a perspective view of an equipment pad with a plurality of integrated risers supporting a condensing unit according to an embodiment of the application.

FIGS. 1 and 3 illustrate exemplary embodiments of the equipment pad 10. The equipment pad 10 may include a base 12, a top surface 14 of the base, and a bottom surface 16 of the base. The base 12 may be any shape adequate for use with a condensing unit 110. It will be appreciated that the base 12 may be rectangular, square, circular, polygonal, or any other shape.

The equipment pad 10 may be made of any material with suitable weight and strength requirements including but not limited to plastic. In an exemplary embodiment, the equipment pad 10 is made of plastic with a base height 11 of up to approximately 3 inches. In another exemplary embodiment, the equipment pad 10 is made of plastic with a base height 11 of approximately one eighth to one half of an inch. One of ordinary skill in the art will appreciate that the equipment pad 10 is not limited to plastic and the base height 11 is not limited to the range of one eighth of an inch to 3 inches.

Furthermore, the equipment pad 10 may be any size suitable for use under a condensing unit 110. Typical equipment pads have dimensions in the range of approximately 16×36 inches to 60×67 inches. One of ordinary skill in the art will appreciate that the equipment pad 10 is not limited to these dimensional ranges and may be any size necessary to accommodate any condensing unit 110.

At least one riser 20 extends from the top surface 14 of the base 12. The riser 20 may extend substantially vertically from the top surface 14 of the base 12. In exemplary embodiments, a single riser 20 extends from the top surface 14 of the base 12. In other exemplary embodiments, the riser 20 may include a number of risers extending from the top surface 14 of the base 12. It should be understood that reference made herein to a riser 20 includes embodiments having a number of risers.

It is envisioned that the riser 20 may be of any height 21 desired to elevate properly a condensing unit 110. In an exemplary embodiment, the riser 20 extends to a height 21 in the range of approximately 2 inches to approximately 15 inches above the top surface 14 of the base 12. In another exemplary embodiment, the riser 20 extends to a height 21 in the range of approximately 3 inches to approximately 12 inches from the top surface 14 of the base 12. In yet another exemplary embodiment, the riser 20 extends to a height 21 of approximately 3 inches to approximately 6 inches from the top surface 14 of the base 12. In still yet another exemplary embodiment, the riser 20 extends to a height 21 of approximately 3 inches from the top surface 14 of the base 12.

Figure 2:
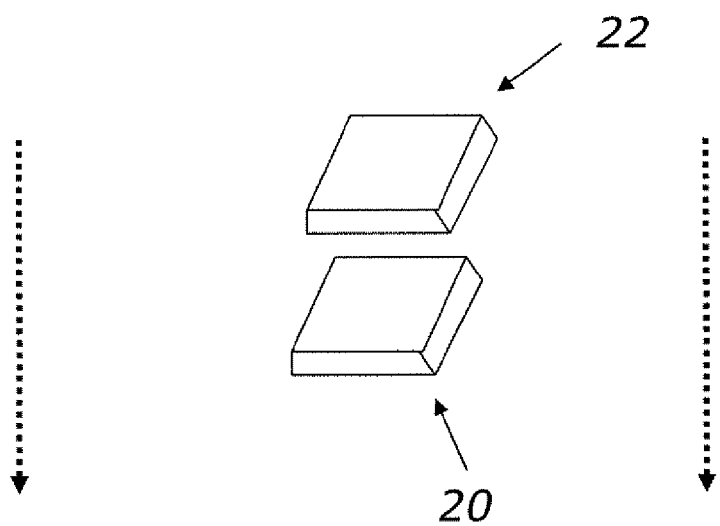
FIG. 2 is a perspective view of a riser with a separate riser cap according to an embodiment of the application.

As shown in the exemplary embodiment illustrated in FIG. 2, the height 11 of a riser 20 may be increased by adding at least one riser cap 22 to the top of the riser 20. The top of the riser 20 and bottom of the riser cap 22 may be connected together using a locking mechanism on the interior or exterior of the riser. Alternatively, the bottom of the riser cap 22 may be adhered to the top of the riser 20 using an adhesive.

The riser 20 may be positioned at any location on the top surface 14 of the base 12. In an exemplary embodiment, the riser 20 is positioned in substantially the center of the top surface 14 of the base 12. The position of the riser 20 is not limited to the center of the base 12 but may be off-center including on the periphery of the top surface 14 of the base, the corners of the base, or any other suitable location.

The riser 20 may be of any shape that is adequate for supporting a condensing unit 110. In an exemplary embodiment, the riser 20 may include a cylindrical shape. In another exemplary embodiment, the riser 20 comprises a polyhedron shape. In yet another exemplary embodiment, the riser 20 may include an ellipsoidal shape.

In an exemplary embodiment, the riser 20 comprises side members 24 that support the top 26 of the riser 20. The side members 24 of the riser 20 may be any shape including rectangular, triangular, conical or any other shape. Further, the riser 20 may include other support structures to assist in the supporting of the condensing unit 110. In one exemplary embodiment, the riser 20 further comprises ribbing in the top of the riser for added support (not pictured). It is contemplated that the ribbing is not necessary if the riser 20 can provide sufficient support without the ribbing.

In an exemplary embodiment, the riser 20 terminates in oval or round footprints on the bottom surface 16 of the base 12 to assist with leveling and support. Additional footprints may be added to the center of the equipment pad 10 depending on the size of the equipment pad 10. Alternatively, the riser 20 may extend beyond the bottom surface 16 of the base 12, thereby providing structural and ground support. In another exemplary embodiment, the bottom surface 16 of the base 12 may include ribbing (not pictured). In yet another exemplary embodiment, insert feet, or any equivalent molded structure, may be added under the riser 20 to increase the ground contact of the equipment pad 10, allowing the ribbing on the base 12 of the equipment pad 10 to be reduced, while still allowing for the nesting of the riser 20. It is farther contemplated that the ribbing can be replaced by arcs or curved beams of plastic, depending on what amount of plastic is necessary to prevent warping during production and to address other related structural issues.

Figure 4:
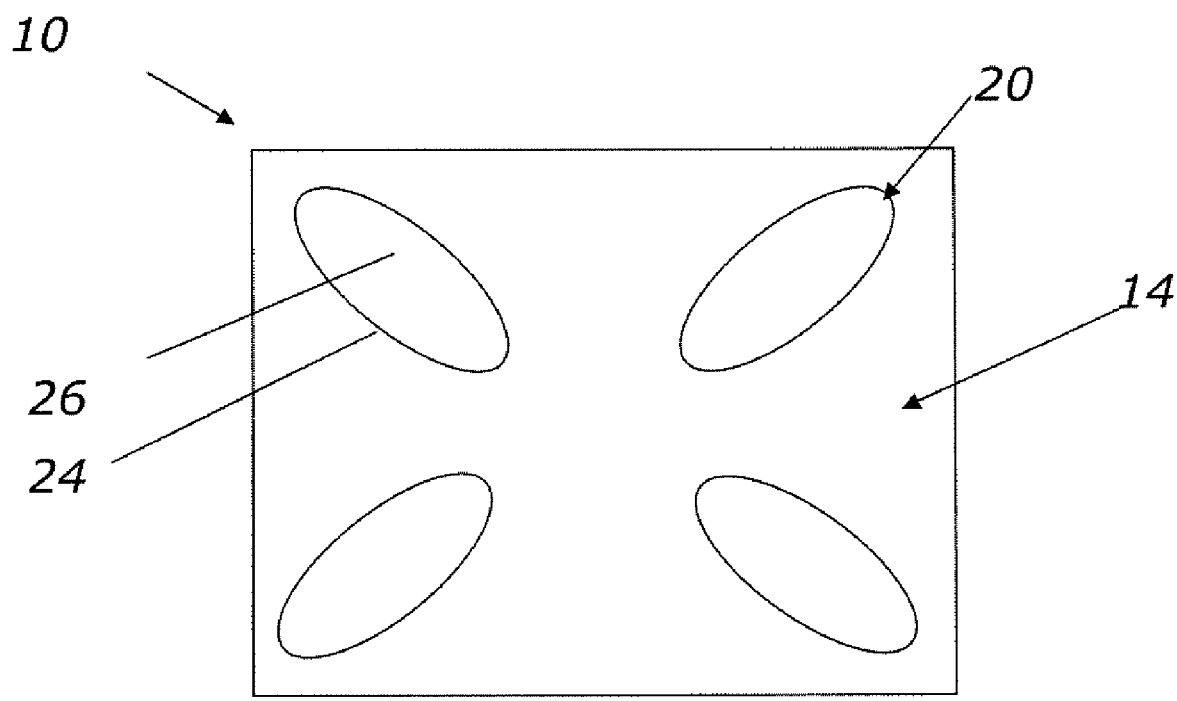
FIG. 4 is a perspective view of an equipment pad with a plurality of integrated risers according to an embodiment of the application.
Figure 5:
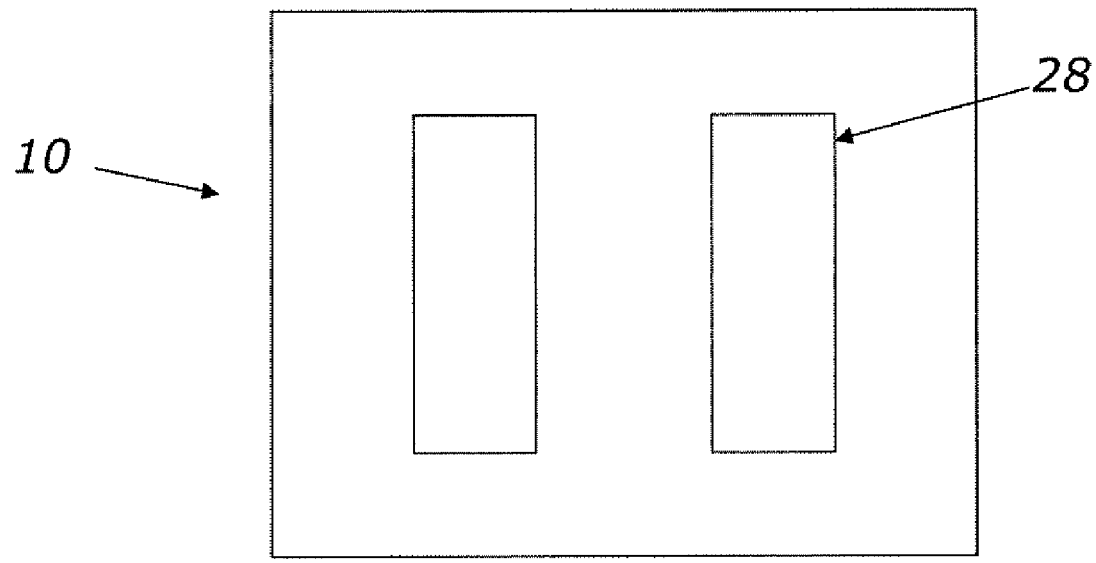
FIG. 5 is a perspective view of an equipment pad with a plurality of integrated risers according to an embodiment of the application.
Figure 6:
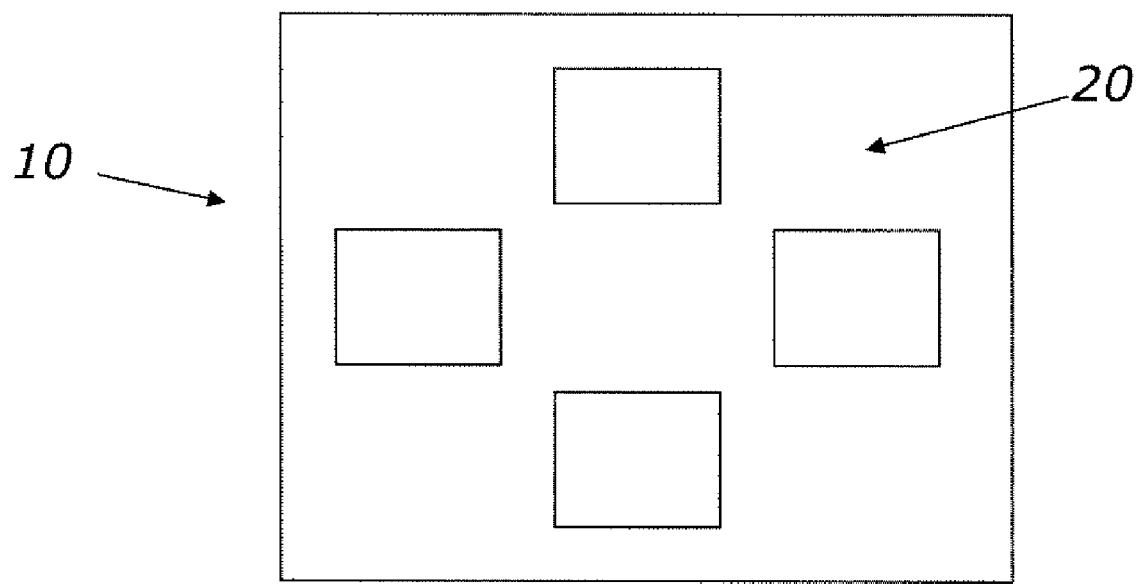
FIG. 6 is a perspective view of an equipment pad with a plurality of integrated risers according to an embodiment of the application.

The equipment pad 10 may include a number of risers 20, as illustrated in an exemplary embodiment in FIG. 4. The plurality of risers 20 may be positioned in any configuration adequate for supporting a condensing unit. In an exemplary embodiment, the equipment pad 10 may include two risers 20 each positioned substantially on opposite sides of the top surface 14 of the base (FIG. 5). In another exemplary embodiment, the equipment pad 10 may include four risers 20 each positioned substantially in a corner of the top surface 14 of the base 12 (FIG. 4). In still another exemplary embodiment, the equipment pad 10 may include four risers 20 each positioned substantially in the center of the periphery of the top surface 14 of the base 12 (FIG. 6). One of ordinary skill in the art will appreciate that any number of risers 20 is contemplated herein and that the number of risers may be positioned in any configuration on the top surface 14 of the base 12. Furthermore, one of ordinary skill in the art will appreciate that the number of risers 20 may have the same height or different heights.

The plurality of risers 20 may be positioned in any configuration including substantially rectangular, square, circular, oval, pyramidal or any other configuration that provides sufficient support to condensing units 110. In an exemplary embodiment illustrated in FIG. 5, the equipment pad 10 includes two substantially rectangular polyhedron shaped risers 28 positioned on opposite sides of the top surface 14 of the base 12. In another exemplary embodiment, the equipment pad 10 includes a number of risers 20 positioned in a substantially rectangular position. In yet another exemplary embodiment, the equipment pad 10 includes a plurality of risers 20 positioned in a substantially triangular position.

The riser 20 may be substantially hollow or solid. The hollow riser provides a lighter equipment pad 10 than would a solid riser 20.

The riser 20 is affixed to the base 12 of the equipment pad 10. In an exemplary embodiment, the riser 20 is preformed with the base 12 of the equipment pad 10 as a unibody structure. The unibody equipment pad 10 may be manufactured through the use of molds or any other manufacturing technique. In another exemplary embodiment, the riser 20 and the base 12 are formed separately and the riser 20 is then affixed to the top surface 14 of the base of the equipment pad 10.

Figure 7:
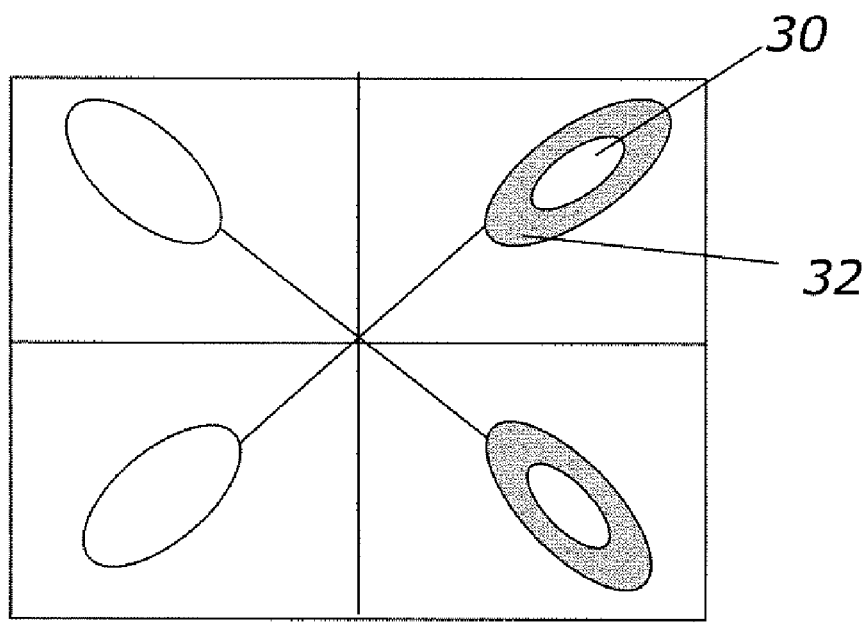
FIG. 7 is a perspective view of the bottom surface of an equipment pad with a plurality of hollow risers according to an embodiment of the application.

FIG. 7 illustrates an exemplary embodiment of the equipment pad 10 with the hollow riser 20. The bottom surface 16 of the base 12 provides openings 30 aligned with the risers 20 and insert feet 32 to increase the ground contact of the equipment pad 10. It should be apparent to those skilled in the art that the position, shape, and number of risers 20 will result in different configurations of the bottom surface 16 of the base 12.

Figure 8:
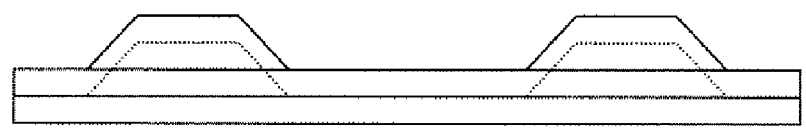
FIG. 8 is a perspective view of a first equipment pad with a plurality of integrated risers stacked with a second equipment pad with a plurality of integrated risers according to an embodiment of the application.

As shown in FIG. 8, the openings 30 allow a number of equipment pads 10 of the same configuration to be stacked or nested together. The number of equipment pads 10 may be stacked or nested by interfacing the top surface 14 of the base 12 and the riser 20 of a first equipment pad 10 with a bottom surface 16 of a base and the riser 20 of a second equipment pad 10. The stackable or nestable utility of the equipment pad 10 allows a number of equipment pads to be stacked or nested together to aid in shipping, retail, or distribution of the equipment pads.

The riser 20 on the equipment pad 10 may be used to support the condensing unit 110 such that the condensing unit rests on the riser. Adhesive, or cushion, may be placed on top of the riser 20 so that the adhesive or cushion resides between the riser and the condensing unit 110 to further secure the condensing unit on the riser. In an exemplary embodiment, mastic adhesive is affixed to the top of the riser 20; however, any adhesive is contemplated herein.

An exemplary embodiment of this application also includes a method for elevating a condensing unit 110. An exemplary embodiment of the method for elevating a condensing unit 110 includes the steps of positioning an equipment pad 10 at a desired location for a condensing unit and positioning the condensing unit on the equipment pad, wherein the equipment pad includes a base 12 and at least one riser 20 affixed to the base, and wherein the at least one riser extends substantially vertically from the base to elevate and support the condensing unit.

It should be apparent that the foregoing relates only to exemplary embodiments of the present application and that numerous changes and modifications may be made herein without departing from the spirit and scope of the application as defined herein.

I claim:

1. An equipment pad for elevating a condensing unit, comprising:
 a base comprising:
  a base surface that extends laterally, and
  a plurality of base openings, each base opening formed completely through the base surface; and
 a plurality of riser portions extending upward from the base to elevate and support the condensing unit, each riser portion comprising:
 a riser top surface, the riser top surface being substantially level and substantially continuous,
  a riser side wall, the riser side wall extending upward from the base so that the riser top surface is elevated above the base surface, the riser side wall tapering inward so that the riser top surface is positioned inward from a perimeter of the base, and
  a riser interior, the riser side wall and the riser top surface defining the boundary of the riser interior, the riser interior aligning with one base opening of the plurality of base openings, the riser interior being substantially hollow between the one base opening and the riser top surface;
 wherein the riser top surfaces together define a support surface for receiving the condensing unit, the support surface being substantially level, and
 wherein the equipment pad is stackable with another similarly shaped equipment pad.

2. The equipment pad of claim 1, wherein the base comprises a plastic material.

3. The equipment pad of claim 1, wherein the base comprises a height in a the range of about ⅛ inch to about 3 inches.

4. The equipment pad of claim 1, wherein the base comprises a height in the range of about 2 to about 3 inches.

5. The equipment pad of claim 1 wherein each of the plurality of riser portions comprises a height in the range of about 2 inches to about 15 inches.

6. The equipment pad of claim 1, wherein each of the plurality of riser portions comprises a height in the range of about 3 inches to about 12 inches.

7. The equipment pad of claim 1, wherein each of the plurality of riser portions comprises a height of about 3 inches.

8. The equipment pad of claim 1, further comprising a plurality of riser caps affixed to the plurality of riser portions to further elevate the condensing unit.

9. The equipment pad of claim 1, wherein at least one riser portion further comprises ribbing inside the at least one riser portion in the top of the at least one riser portion.

10. The equipment pad of claim 1, wherein the base and the plurality of riser portions comprise a unibody structure.

11. The equipment pad of claim 1, wherein the base comprises a top base surface and a bottom base surface.

12. The equipment pad of claim 11, wherein the bottom base surface further comprises insert feet at at least one base opening.

13. The equipment pad of claim 1, wherein the base comprises a base side wall, the base surface extending laterally inward from the base side wall.

14. The equipment pad of claim 13, wherein:
 the base side wall extends downward about a periphery of the base surface; and
 the equipment pad further comprises ribbing extending downward from an underside of the base surface.

15. The equipment pad of claim 1, further comprising ribbing extending downward from the base surface.

16. The equipment pad of claim 1, further comprising a base side wall extending downward about a periphery of the base surface.

* * * * *

UNITED STATES PATENT AND TRADEMARK OFFICE
CERTIFICATE OF CORRECTION

PATENT NO.        : 7,891,635 B2                                         Page 1 of 1
APPLICATION NO.   : 11/833298
DATED             : February 22, 2011
INVENTOR(S)       : Jay F. Rowland It is certified that error appears in the above-identified patent and that said Letters Patent is hereby corrected as shown below:

On the Title page, item (75); Inventor reading "Jay R. Rowland" should read -- Jay F. Rowland --

In Column 5, lines 38-39, the portion of claim 3 reading "comprises a height in a the range" should read -- comprises a height in the range --

Signed and Sealed this
Twelfth Day of April, 2011

David J. Kappos
*Director of the United States Patent and Trademark Office*